(12) United States Patent
Xu et al.

(10) Patent No.: US 7,899,783 B1
(45) Date of Patent: Mar. 1, 2011

(54) MONITORING DATA INTEGRITY

(75) Inventors: Yi-Le Gloria Xu, Cupertino, CA (US);
Sam Chi Lee, San Jose, CA (US);
Shmuel Shaffer, Palo Alto, CA (US)

(73) Assignee: Cisco Technology, Inc, San Jose, CA (US)

( * ) Notice: Subject to any disclaimer, the term of this patent is extended or adjusted under 35 U.S.C. 154(b) by 109 days.

(21) Appl. No.: 11/421,049

(22) Filed: May 30, 2006

(51) Int. Cl.
*G06F 7/00* (2006.01)
*G06F 17/00* (2006.01)
*G06F 15/167* (2006.01)

(52) U.S. Cl. .................................. 707/613; 709/213
(58) Field of Classification Search .......... 707/100–103, 707/200–203; 705/1, 8, 9; 715/501.1, 511, 715/517
See application file for complete search history.

(56) References Cited

U.S. PATENT DOCUMENTS

| | | | | |
|---|---|---|---|---|
| 5,884,328 A * | 3/1999 | Mosher, Jr. | .................... | 707/202 |
| 6,330,568 B1 * | 12/2001 | Boothby et al. | ............. | 707/201 |
| 6,477,545 B1 * | 11/2002 | LaRue | .......................... | 707/201 |
| 6,490,722 B1 * | 12/2002 | Barton et al. | ................. | 717/174 |
| 6,898,791 B1 * | 5/2005 | Chandy et al. | ............... | 719/314 |
| 7,216,289 B2 * | 5/2007 | Kagle et al. | .................... | 715/256 |
| 7,493,310 B2 * | 2/2009 | Eryurek et al. | ................... | 707/3 |
| 2005/0044165 A1 * | 2/2005 | O'Farrell et al. | ............. | 709/213 |
| 2006/0089837 A1 * | 4/2006 | Adar et al. | ........................ | 705/1 |
| 2007/0118577 A1 * | 5/2007 | East | .............................. | 707/204 |

OTHER PUBLICATIONS

Fox et al. (IEEE Publication: "Visualization in Interrogator Using Graphvz", May 6, 2006, pp. 390-392.*

* cited by examiner

*Primary Examiner* — Susan Y Chen
(74) *Attorney, Agent, or Firm* — Schwegman, Lundberg & Woessner, P.A.

(57) ABSTRACT

A method and system are described for reporting on data integrity in a data repository which is configured for synchronization with at least one other data repository. The method comprises interrogating metadata associated with the data repository to establish a latest two consecutive synchronization times at which no updates were processed. The method further comprises automatically generating an indication message to provide an indication of the data integrity at the latest of the synchronization times.

13 Claims, 5 Drawing Sheets

| | TIME | ACTION | SUBSCRIBER |
|---|---|---|---|
| 306 | T1 | DOWNLOADED 5 DATA CHANGES | A |
| 307 | T2 | PUSHED 5 DATA CHANGES | B |
| 308 | T3 | DOWNLOADED 1 DATA CHANGE | C |
| 309 | T4 | NO DATA NEEDED TO BE MERGED | A |
| 310 | T5 | NO DATA NEEDED TO BE MERGED | A |

MONITORING DATA INTEGRITY

FIELD

This application relates generally to data integrity, and specifically to a method of and system for monitoring data integrity in cluster-based or distributed networks.

BACKGROUND

Some cluster-based or distributed computer networks require high data availability or fault tolerance. Such networks typically comprise a number of databases which have to be synchronised continually, so that there is intermittent replication of data on one database in another database. In a typical example, the network may have one publisher database and a plurality of subscriber databases. Changes in data on a subscriber database are replicated on the publisher database, and the subscriber databases are then synchronised with the publisher database when data has been changed or updated. In a customer contact centre, for example, data on the subscriber databases is continually updated as new telephone calls are made and received, and the subscriber database is synchronised with the publisher database. The synchronisation can occur as soon as possible, subject to the queuing of closely spaced changes on respective subscriber databases, but may also occur at pre-defined synchronisation intervals.

Also, it is undesirable to have network downtime, so that when the publisher database fails, one of the subscriber databases automatically assumes the role of publisher database, the contents of the publisher database having been replicated on that subscriber database. When the old publisher database recovers, the contents of the subscriber database are synchronised with the new publisher database, and the old publisher database resumes its normal function.

In instances where historical reports are generated from the databases, it may be important to obtain reports with high data integrity, as the historical reports are used to evaluate system and personnel performance as well as plan future staffing and operations of the contact centre.

The replication and synchronisation processes introduce latency into the data integrity. It is not always practical or even possible to synchronise the databases immediately, and synchronising events sometimes need to be queued. Thus, a historical report doesn't always reflect the most updated recent data, for example when the data on at least one subscriber database has not yet been synchronised with the publisher database, or vice versa. A person viewing a report generated with reference to one of these databases has no way of knowing whether or not the report reflects the most updated recent data.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
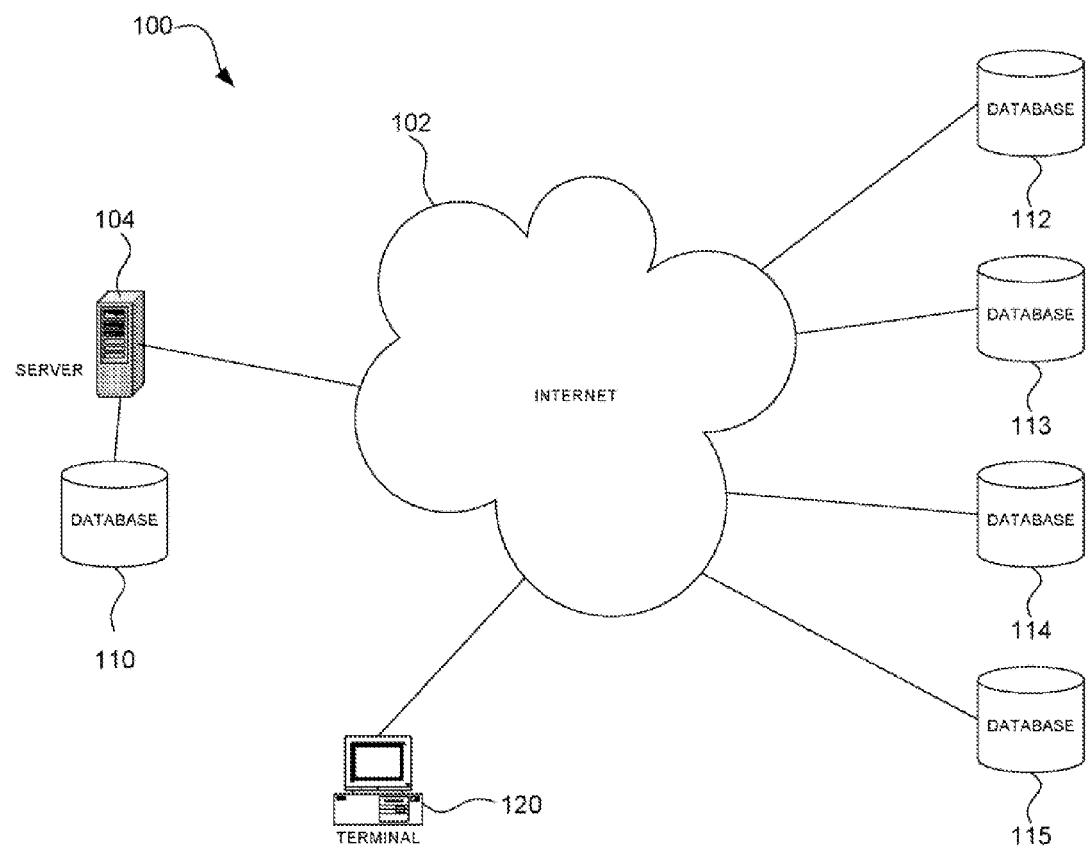
FIG. 1 shows a schematic diagram of a network used in an example embodiment.

FIG. 1 shows a schematic diagram of a network, which is generally indicated by reference numeral 100. The network 100 is configured for performing a method of reporting on data integrity in a data repository which is configured for synchronisation with at least one other data repository, in accordance with an example embodiment. The method comprises interrogating metadata associated with the data repository to establish a latest two consecutive synchronisation times at which no updates were processed. The method further comprises automatically generating an indication message to provide an indication of the data integrity at the latest of the synchronisation times.

The network 100 includes a data repository in the form of a publisher database 110, which may be hosted by a computer server 104. The publisher database 110 is in communication with a plurality of distributed data repositories in the example form of subscriber databases 112 to 115 via a network, in this example the Internet 102. The term data repository is intended to include any electronic collection of data which can be replicated, and includes not only a database but also any collection of non-structured data, electronic files, electronic directories, and the like. The term database is intended to include any organised collection of information records that can be accessed electronically.

The terms "publisher database" and "subscriber database" are used merely for ease of reference, and do not necessarily imply a master/slave relationship between database 110 and databases 112 to 115, or a specific network topology.

The network 100 may, for example, be used to support contact or customer call centres, although it is to be appreciated that the methodologies described herein will find useful application in any network in which synchronisation of a plurality of databases is desirable. The publisher database 110 and the subscriber databases 112 to 115 may be geographically spaced from one another. For example, a company may have customer call centres for technical support and/or marketing and sales in a plurality of cities, each customer call centre having an associated subscriber database 112 to 115. The publisher database 110 may conveniently be at a head office of the company, the publisher database 110 being in electronic communication with the subscriber databases 112 to 115.

The databases 112 to 115 may be hosted by computer systems, for example computer servers, which may be similar to computer server 104. It is also to be appreciated that the publisher database 110 may be provided by a computer system that is remote from the computer server 104.

The publisher database 110 may be configured to synchronise or replicate its data onto each of the subscriber databases 112 to 115. This replication may be done as soon as possible, subject to queuing of separate replication events, although in an embodiment it may be done at pre-defined synchronisation intervals. Data may be continually changed on and written to any one or more of the subscriber databases 112 to 115. In the example of a customer call centre, as calls from customers are received, call processing data such as, for example, bibliographic data, call time, duration, caller information, receiver (e.g., a call processing agent), etc., may be written to the subscriber databases 112 to 115 (e.g., in real-time). The subscriber databases 112 to 115 are configured then to synchronise or replicate their data with the publisher database 110. The term "synchronise" in this context includes any replication and/or merge functions performed by the databases 110, 112 to 115, for example to combine and/or copy data.

A log or record (e.g. replication audit trail) may be kept of each synchronisation event between the databases 110 to 115. The synchronisation events of which a record is kept include synchronising data between the databases 110 to 115, and also includes interrogating the databases 110 to determine whether or not the databases 110 to 115 are synchronised. The log may be stored as metadata, for example general precompiled metadata, in a metatable format. The term 'metadata' is intended to include structured data about a resource or about other data. Metadata therefore may refer to structured data about the databases 112 to 115. In an existing application, specifically a Microsoft SQL server application, the metatable 208 is automatically compiled and is named 'MSmerge_history' (refer to FIG. 3).

Figure 2A:
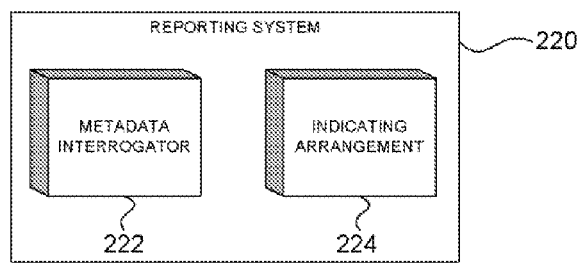
FIG. 2*a* shows a schematic diagram of a reporting system broadly in accordance with an example embodiment.

Referring now to FIG. 2a, a schematic diagram of a broad reporting system 220 in accordance with an example embodiment is shown. The reporting system 220 includes metadata interrogator module 222 to interrogate metadata, particularly the MSmerge_history metatable 208. The reporting system 220 further includes an indicating arrangement 224 to indicate to a user results of the metadata interrogation.

Figure 2B:
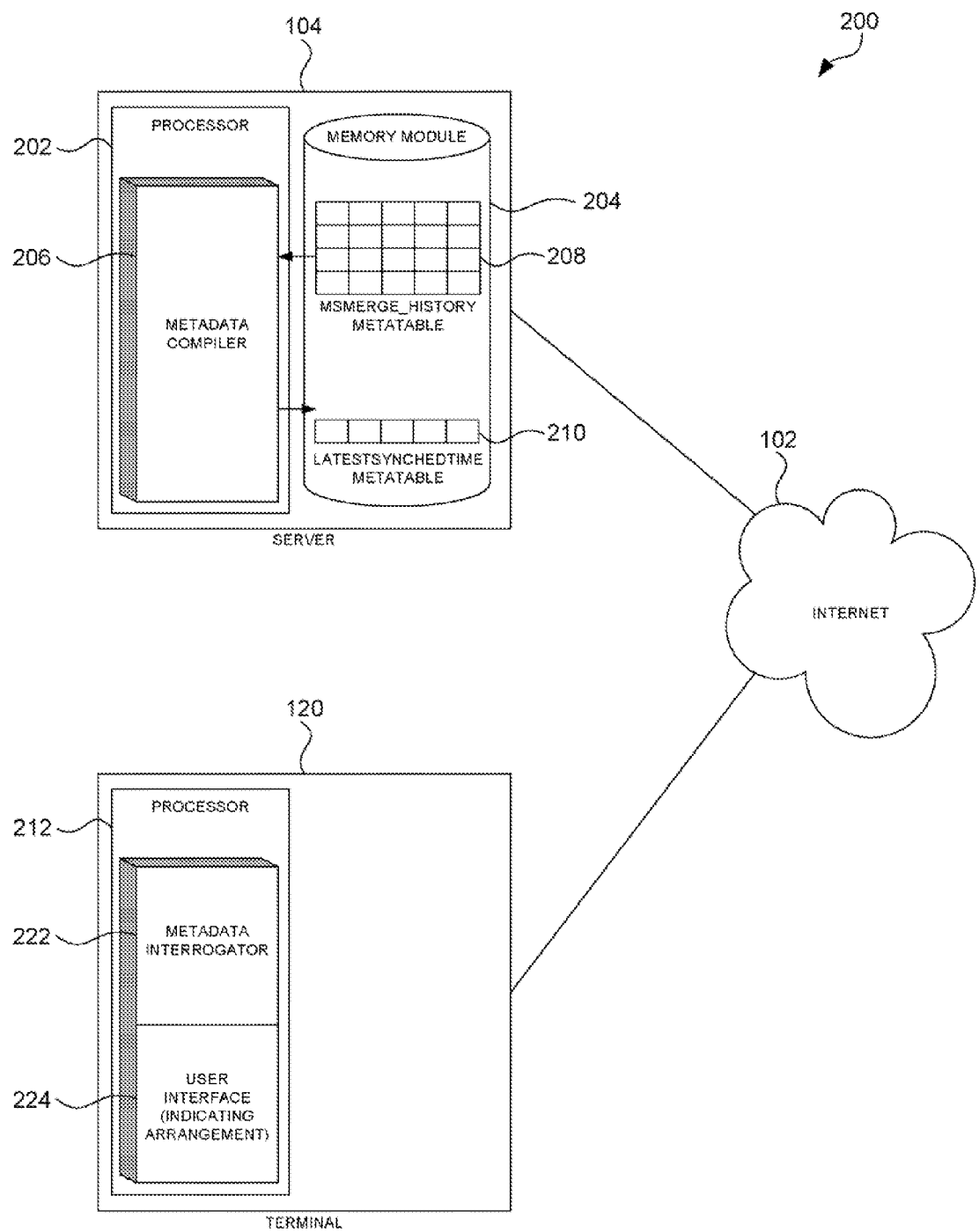
FIG. 2*b* shows a schematic diagram of a more specific reporting system in accordance with an example embodiment.

Referring now the FIG. 2b, a schematic diagram of a more specific reporting system 200 in accordance with an example embodiment is shown. The reporting system 200 includes computer server 104. The computer server 104 includes a processor 202 and a memory module 204, for example in the form of a hard disk drive. The processor 202 includes a metadata compiler mobile 206, which may be provided by computer software executed on the processor 202 to direct the operation thereof. The memory module 204 has stored thereon general precompiled metadata in the form of the MSmerge_history metatable 208, and dedicated metadata in the form of a LatestSynchedTime metatable 210 compiled from the MSmerge_history metatable 208. The metadata compiler 206 is thus operable continually to extract data from the MSmerge_history metatable 208 and compile the LatestSynchedTime metatable 210. The method by which the dedicated metatable 210 is compiled is described by way of example in greater detail below. In an example embodiment (not shown), the memory module 204 in which one or more of the metatables 208, 210 are kept may be remote from the computer server 104.

A client computer 120 includes a processor 212 which includes the metadata interrogator 222 and the indicating arrangement 224 in the example form of a graphical user interface. The metadata interrogator 222 and the user interface 224 may be embodied in computer software which provides an application for reporting on data in the publisher database 110, this application being arranged for providing an indication on the user interface 224 of the integrity of data on the publisher database 110. The client computer 120 is in electronic communication with the computer server 104 via the Internet 102, but it should be appreciated that, in other embodiments, the reporting application may reside on the server 104.

Figures 3, 4A:
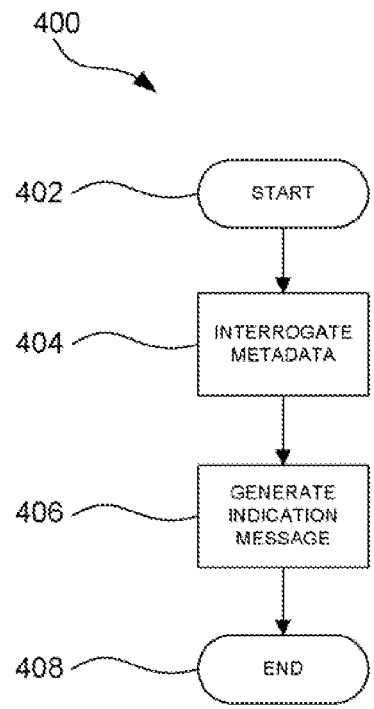
FIG. 3 shows an example of a metadata table indicative of a replication history between two databases in the network of FIG. 1.
FIG. 4*a* shows, broadly, a flow diagram of a method of reporting on data integrity in a database, in accordance with an example embodiment.

FIG. 3 shows the MSmerge_history metatable 208, which includes a plurality of entries or articles 306 to 310 which represent respective synchronisation events, each article comprising an individual row in the table 208. For ease of description, the table 208 shows only five articles. The MSmerge_history metatable 208 may include a plurality of columns, only two of which are shown. A first column 302 indicates a time at which the respective synchronisation event occurred, while a second column 304 comprises a description of the nature of the respective synchronisation event. The MSmerge_history metatable 208 represents synchronisation events between the publisher database 110 and all the respective subscriber databases 112 to 115. In an example embodiment, as shown in a third column 305 that identifies which subscriber was synchronized. For example, in a multi-subscriber scenario, any update on any subscriber may be replicated to the publisher, and the publisher will then replicate the change to all the other subscribers. Data in the third column (that identifies the subscriber) may keep track of on which subscriber a change occurs. The example MSmerge_history metatable 208 shows five data changes downloaded on subscriber "A" and five data changes pushed to subscriber "B".

Some articles in the MSmerge_history metatable 208 indicate a replication report of the replication of a specified number of articles from one database to another. Other articles in the MSmerge_history metatable 208 indicate that the databases 110, 112 to 115 are synchronised, and that no data needs to be synchronised or replicated (see for example articles 309, 310). In such case, the entry in the "ACTION" column reads "NO DATA NEEDED TO BE MERGED". For example, this may mean, a publisher downloaded five data changes from subscriber A, and pushed these changes to subscriber B. In an example multi-subscriber scenario the publisher may have downloaded the changes that happened on A. In order to synchronize up all the subscribers, the publisher may then push the changes to all the other subscribers.

It will be understood that, in other embodiments, the MSmerge_history metatable 208 may be stored on a computer system remote from computer server 104, for example on a computer system which hosts one of the subscriber databases 112 to 115.

In accordance with an example embodiment, the metadata compiler 206 of the computer server 104 extracts from the MSmerge_history metatable 208, in a manner described in more detail below, a most recent time at which the databases 110 to 115 were completely synchronised, and creates a status flag which includes the timestamp (refer further to FIG. 4b). The status flag may be in the form of dedicated metadata, further referred to as the LatestSynchedTime metatable 210. In the example embodiment, the LatestSynchedTime metatable 210 is accessible by the historical reporting application (which includes the metadata interrogator 222). In other embodiments, the timestamp may be in the form of a generic table, a computer file, or the like.

The metadata compiler 206 may be in the form of computer program, such as a SQL script. The metadata compiler 206 checks the MSmerge_history metatable 208 periodically, for example every five minutes, to determine whether or not the databases were synchronised at a time later than the time stamp in the LatestSynchedTime metatable 210, and if so, writes a newer timestamp to the LatestSynchedTime metatable 210. The SQL script may be executed on the computer server 104 which stores the MSmerge_history metatable 208 (e.g., back-end execution), but in another example embodiment it may be executed from the client computer 120 which runs the historical reporting application (e.g., front-end execution). In an example embodiment, a process may be invoked that initiates immediate synchronization between distributed databases so to enhance the data integrity of the databases prior to checking the MSmerge_history metatable 208.

When a user executes the historical reporting application to generate a historical report, a time period is specified for which the relevant data is to be displayed. The specified time period has a start time and an end time, with the end time typically being real-time if no other end time is specified. Upon execution of the reporting application, for example from the client computer 120 remote from the database 110, to generate a historical report, the end of time of the report period is compared with the timestamp in the LatestSynchedTime metatable 210. If the end time of the requested historical report is later than the time of the timestamp, it means that synchronisation between the databases 110, 112 to 115 might not have been completed, and that the historical report might contain only partial data, for example out-of-date data. It is to be appreciated that the data in the historical report which pre-dates the timestamp is accurate, but that accuracy of data in the historical report which post-dates the timestamp is unknown.

The client computer 120 is configured to display via the user interface 224 an alert message if the specified end time is later than the time stamp in the LatestSynchedTime metatable 210, to alert a user to the fact that the historical report may well not be fully accurate, for example being accurate only up to the time of the timestamp in the LatestSynchedTime metatable 210, the user interface 224 therefore acting as a indicating arrangement 224. The user may choose to wait for further synchronisation events to occur to allow full synchronisation between the databases 110, 112 to 115, or, instead, the user may choose to scale back or back-date, the end time of the historical report to a time when the historical report was known to be accurate (e.g. the time of the timestamp). In another example embodiment (not shown) in which replication and/or synchronisation between the databases 110, 112 to 115 occurs at pre-defined synchronisation intervals, the computer system 100 is configured to provide the user with an option to force a synchronisation event so that an accurate historical report can be generated.

Although an example embodiment has been described with reference to the SQL program which generates the LatestSynchedTime metatable 210, it is to be appreciated that, in another example embodiment, the historical reporting application can interface directly with the MSmerge_history metatable 208 to extract the timestamp, the historical reporting application therefore still acting as a metadata interrogator 222. In such a case, MSmerge_history metatable 208 may be configured to be directly accessible by the historical reporting application.

Figure 4B:
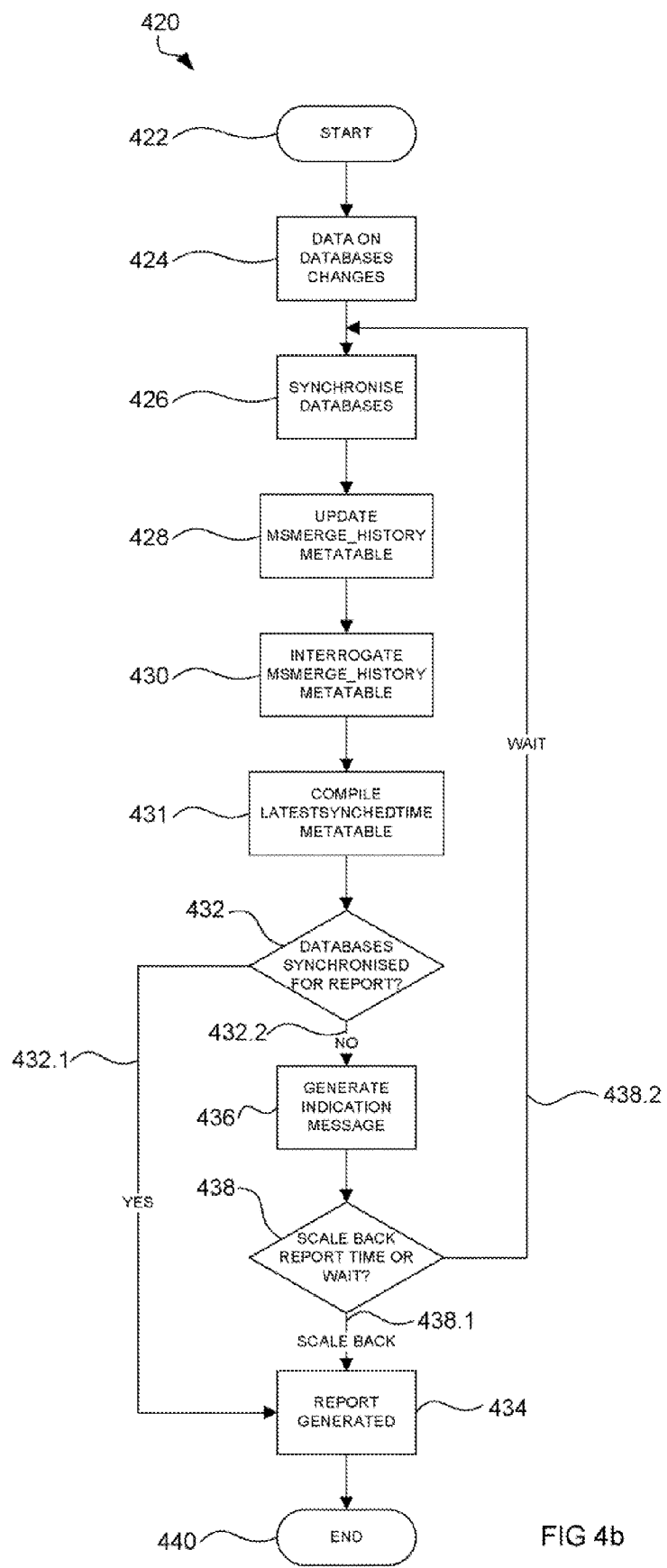
FIG. 4*b* shows a more specific flow diagram of a method of reporting on data integrity in a database, in accordance with an example embodiment.

FIGS. 4a and 4b of the drawings show flow diagrams 400 and 420 of a method of operation of the system 100, in use. Flow diagram 400 shows a simplified overview of operation of the reporting application. The method 400 is started, at block 402, when a user executes the application to generate a historical report. The metadata is interrogated, at block 404, by the metadata interrogator 222 to establish the accuracy of the data on which a report is to be compiled, and an indication message is generated, at block 406, by the indicating arrangement 224 to communicate to the user whether or not the requested report will be accurate. The flow diagram 400 ends at block 408.

Flow diagram 420, which starts at block 422, describes the method in accordance with the example embodiment in more detail. The subscriber databases 112 to 115 (and/or the publisher database 110) may be updated or changed on an ongoing basis, at block 424, for example in response to logging of incoming calls from customers.

The updated or changed data in any one of the subscriber databases 112 to 115 is communicated via the Internet 102 to synchronise, at block 426, the subscriber databases 112 to 115 with the publisher database 110. Synchronisation events (e.g., synchronisation communications from the subscriber databases 112 to 115 to the publisher database 110) may be configured to occur as frequently as possible. However, synchronisation events are often queued, or may be fairly time-consuming, and therefore might not always occur in real-time. Latency in data integrity is thus introduced into the system 200, so that there may be discrepancies between the data in the respective databases 110, 112 to 115.

The computer server 104 may automatically update, at block 428, the MSmerge_history metatable 208 which keeps a record of every synchronisation event. When the databases 110, 112 to 115 have been completely synchronised (e.g., when no further data needs to be copied between the databases 112 to 115), a timestamp is created, at block 430, which indicates the time of the last complete synchronisation. In an example embodiment, the timestamp is generated at a time of the last two consecutive entries in the MSmerge_history metatable 208 which indicate that "no data needed to be merged". For example, consecutive articles 309 and 310 of the MSmerge_history metatable 208 both indicate "NO DATA NEEDED TO BE MERGED", and time T5 (the time entry in article 310) is the time used for the timestamp.

The metadata compiler 206 writes, at block 431, the timestamp to LatestSynchedTime metatable 210, which is accessible by the historical reporting application. The SQL program may check the MSmerge_history metatable 208 intermittently (e.g., every five minutes) to determine if a more recent occurrence of consecutive "no data are needed to be merged" entries is present in the MSmerge_history metatable 208 than the timestamp in the LatestSynchedTime metatable 210. If this is the case, a new timestamp may be copied to the LatestSynchedTime metatable 210.

When the historical reporting application is launched, the application may gather necessary data from the publisher database 110 (or from the other databases 112 to 115) to generate the historical report in conventional fashion. As explained above, the reporting application in this example embodiment may serve to report on customer calls between two user-defined times. The application may thus gather data from the publisher database 110 for the period between the defined times. However, the historical reporting application may also check, at block 432, the timestamp as stored in the LatestSynchedTime metatable 210, to determine whether or not the databases 110, 112 to 115 were completely synchronised at or after the end time specified in the report. Again, in another example embodiment (not shown), the historical reporting application can be configured to check the MSmerge_history metatable 208 directly. If, at branch 432.1, the databases 110, 112 to 115 were completely synchronised at or after the end time specified in the report, the historical report is generated, at block 434, and it is known that the historical report is accurate.

If however, at branch 432.2, the timestamp of the LatestSynchedTime metatable is earlier than the end time of the report period, the databases 110, 112 to 115 are not necessarily completely synchronised for the report period and the indicating arrangement 224 (e.g. the user interface) indicates, at block 436, to the user the time at which the last known synchronisation occurred and that data in the historical report might not be accurate. The indicating arrangement 224 (e.g. the user interface) presents, at block 438, the user with options, via a selection menu. The user may select a first option, at branch 438.1, which scales back the time of the historical report to the time when the databases 110, 112 to 115 were last known to be completely synchronised, e.g., to the time of the timestamp stored in the LatestSynchedTime metatable 210.

The user may alternatively select a second option, at branch 438.2, to wait a pre-defined time, e.g. five minutes, to check again if the databases 110, 112 to 115 are completely synchronised. The process is then repeated from block 432. The flow diagram 420 ends at block 440.

In another example embodiment (not shown), the indication arrangement 224 may provide a menu option to force database synchronisation. In yet another example embodiment (not shown), the system may skip the user interaction altogether and automatically force database synchronisation. It is important to note that in although example embodiments the tables may be Microsoft specific, the invention is not limited to Microsoft SQL databases and MS technology.

Figure 5:
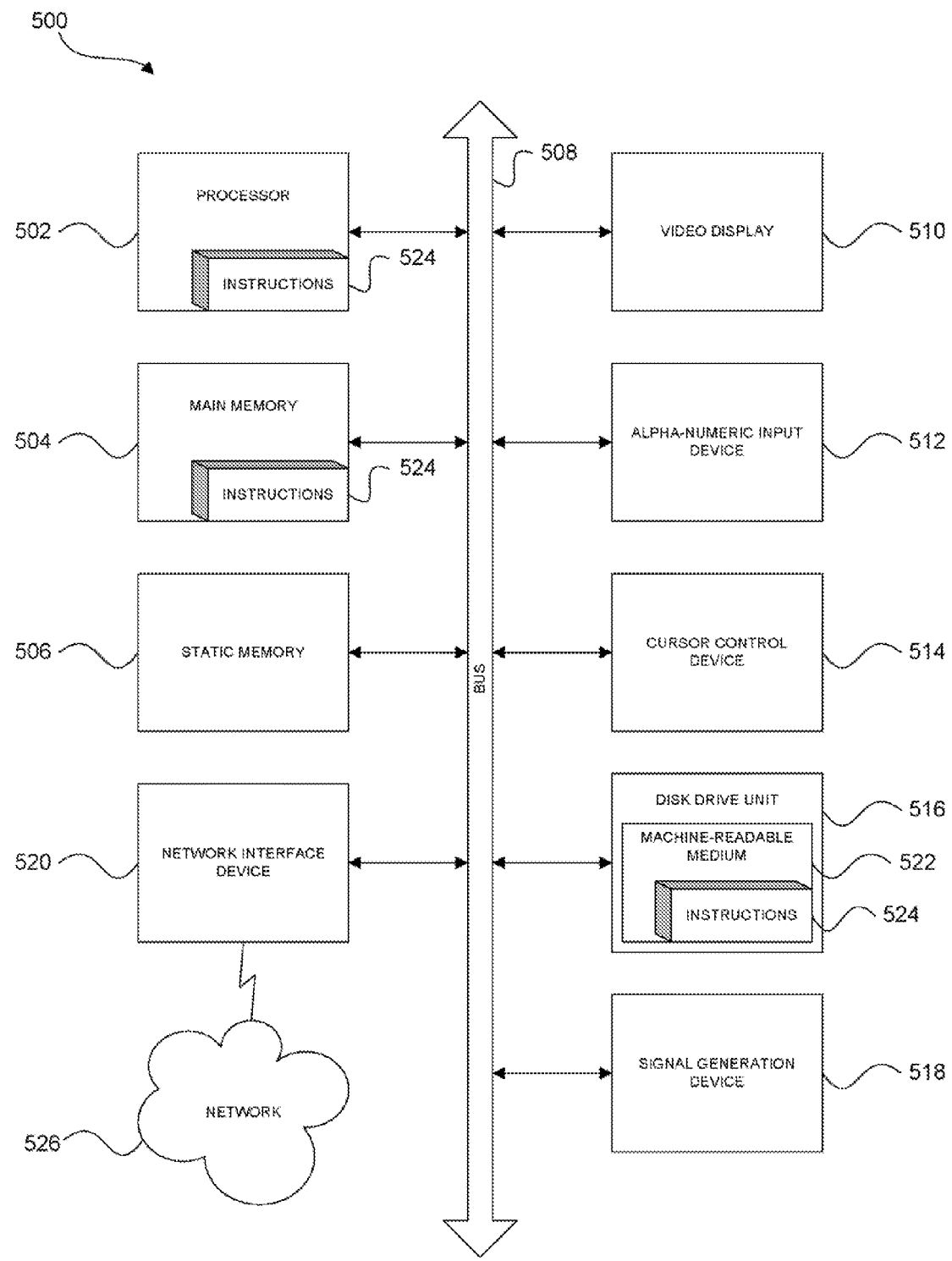
FIG. 5 shows a diagrammatic representation of a machine in the example form of a computer system within which a set of instructions, for causing the machine to perform any one or more of the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Computer server 104 and/or client computer 120 may be in the form of computer system 500.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of reporting on data integrity in a publisher data repository that is configured for synchronization with a subscriber data repository, comprising:

applying at least one computer processor to perform data synchronization between the two data repositories including:

maintaining a history table of synchronization events occurring between the data repositories, wherein the history table is maintained by either of the repositories and includes metadata representing, for each synchronization event, a synchronization time and a description of the synchronization event;

interrogating the metadata by reading from the history table the latest two consecutive synchronization times at which no data needed to be merged between the data repositories;

automatically generating an indication message at the subscriber data repository to indicate the data integrity between the publisher and subscriber data repositories, wherein the indication message provides a time stamp indicative of the later one of the two latest consecutive synchronization times, and, in the event that an end time of a report period in a requested data integrity report is later than the time stamp in the generated message, alerts a user that the requested report is accurate only to the time stamp in the generated message; and providing the user, in such event, with menu options comprising:

1) scaling back the end time of the report period to a time earlier than or equal to the time stamp in the generated message;

2) delaying generation of the requested report until the time stamp in the generated message is equal to or later than the end time of the report period, and 3) initiating immediate synchronization between the data repositories.

2. The method as claimed in claim 1, in which the data repositories are relational databases, and in which maintaining the history table comprises interrogating general pre-compiled metadata indicative of the synchronization events between the databases, to extract a time value for the later one of the two latest consecutive synchronization times at which no data needed to be merged between the data repositories, and for populating the time stamp in the generated message with the extracted time value.

3. The method as claimed in claim 2, in which interrogation of the pre-compiled metadata to extract the time value occurs intermittently at pre-scheduled intervals.

4. A non-transitory computer-readable medium embodying instructions which, when executed by at least one computer processor, cause the at least one computer processor to:
perform data synchronization between a published data repository and at least one other data repository including a subscriber data repository; and
report on data integrity among the data repositories, including:
maintaining a history table of synchronization events occurring among the data repositories, wherein the history table is maintained by any one of the data repositories and includes metadata representing, for each synchronization event, a synchronization time and a description of the synchronization event;
interrogating the metadata by reading from the history table the latest two consecutive synchronization times at which no data needed to be merged among the data repositories;
automatically generating an indication message at the subscriber data repository to provide the data integrity among the data repositories, wherein the indication message provides a time stamp indicative of the later one of the two consecutive synchronization times, and, in the event that an end time of a report period in a requested data integrity report is later than the time stamp in the generated message, alerts a user that the requested report is accurate only to the time stamp in the generated message; and
providing the user, in such event, with menu options comprising:
1) scaling back the end time of the report period to a time earlier than or equal to the time stamp in the generated message;
2) delaying generation of the requested report until the time stamp in the generated message is equal to or later than the end time of the report period, and
3) initiating immediate synchronization between the data repositories.

5. A reporting system to report on data integrity in a published data repository that is configured for data synchronization with at least one other data repository including a subscriber data repository, the system comprising:
at least one computer processor coupled to the data repositories to perform the data synchronization among the data repositories;
a history table of synchronization events occurring among the data repositories, wherein the history table is maintained by any one of the data repositories and includes metadata representing, for each synchronization event, a synchronization time and a description of the synchronization event;

a metadata interrogator to read from the history table the latest two consecutive synchronization times at which no data needed to be merged among the data repositories; and
a user interface at the subscriber data repository including an indicating arrangement to automatically generate an indication message to indicate the data integrity among the data repositories, wherein the indication message provides a time stamp indicative of the later one of the two consecutive synchronization times and, in the event that an end time of a report period in a requested data integrity report is later than the time stamp in the generated message, alerts a user that the requested report is accurate only to the time stamp in the generated message, and wherein, in such event, the user interface is to provide the user with menu options comprising:
1) scaling back the end time of the report period to a time earlier than or equal to the time stamp in the generated message;
2) delaying generation of the requested report until the time stamp in the generated message is equal to or later than the end time of the report period, and
3) initiating immediate synchronization between the data repositories.

6. The system as claimed in claim 5, in which the indicating arrangement is configured to display the indication message on the user interface, the indication message including a report on whether or not the time stamp in the generated message is later than the end time of the report period of the requested report.

7. The system as claimed in claim 5, in which the metadata interrogator is arranged to interrogate dedicated metadata that includes the time stamp in the generated message.

8. The system as claimed in claim 7, which includes a dedicated metadata compiler that is arranged continually to interrogate general pre-compiled metadata relating to the synchronization events among the data repositories, to identify from the pre-compiled metadata the latest two consecutive synchronization times at which no data needed to be merged among the data repositories, and to populate the time stamp in the generated message with the later one of the two consecutive synchronization times.

9. The system as claimed in claim 8, in which the metadata compiler is programmed to interrogate the pre-compiled metadata at regular intervals.

10. The system as claimed in claim 5, wherein an immediate synchronization with the at least one other data repository is invoked prior to interrogating the metadata.

11. A computer network, comprising:
at least two distributed data repositories coupled together and arranged for automatic data synchronization;
at least one computer processor coupled to the data repositories to perform the data repository synchronization;
a history metatable to maintain a history table of synchronization events occurring among the data repositories, wherein the history table is maintained by any one of the data repositories and includes metadata representing, for each synchronization event, a synchronization time and a description of the synchronization event;
a data integrity reporting system that comprises
a metadata interrogator to read from the history table the latest two consecutive synchronization times at which no data needed to be merged among the data repositories; and
an indicating arrangement to automatically generate an indication message to indicate the data integrity among the data repositories, wherein the indication message provides a time stamp indicative of the later one of the two consecutive synchronization times, and, in the event that an end time of a report period in a requested data integrity report is later than the time stamp in the generated message, alerts a user that the requested report is accurate only to the time stamp in the generated message, and wherein, in such event, provides the user with menu options comprising:
1) scaling back the end time of the report period to a time earlier than or equal to the time stamp in the generated message;
2) delaying generation of the requested report until the time stamp in the generated message is equal to or later than the end time of the report period, and
3) initiating immediate synchronization between the data repositories;
the reporting system being operatively coupled to the data repositories to generate synchronization reports in at least one of the data repositories.

12. The network as claimed in claim 11, in which the data repositories are relational databases.

13. The network as claimed in claim 11, which forms part of a customer contact call center, the data repositories being to keep a record of customer telephone calls received by human operators or by menu options provided by the system.

* * * * *